United States Patent
Sun

(10) Patent No.: US 10,804,050 B2
(45) Date of Patent: Oct. 13, 2020

(54) MEMBRANE KEYBOARD STRUCTURE AND CONDUCTIVE METHOD OF SAME

(71) Applicant: Jen-Wen Sun, New Taipei (TW)

(72) Inventor: Jen-Wen Sun, New Taipei (TW)

( * ) Notice: Subject to any disclaimer, the term of this patent is extended or adjusted under 35 U.S.C. 154(b) by 0 days.

(21) Appl. No.: 16/131,041

(22) Filed: Sep. 14, 2018

(65) Prior Publication Data

US 2020/0090883 A1 Mar. 19, 2020

(51) Int. Cl.
| | |
|---|---|
| *H01H 13/48* | (2006.01) |
| *H01H 13/702* | (2006.01) |
| *H01H 13/703* | (2006.01) |
| *H01H 13/704* | (2006.01) |
| *H01H 13/70* | (2006.01) |
| *G06F 3/02* | (2006.01) |
| *H01H 13/14* | (2006.01) |

(52) U.S. Cl.
CPC ....... *H01H 13/7006* (2013.01); *G06F 3/0202* (2013.01); *H01H 13/702* (2013.01); *H01H 13/703* (2013.01); *H01H 13/704* (2013.01); *H01H 13/14* (2013.01); *H01H 13/48* (2013.01); *H01H 2219/03* (2013.01); *H01H 2221/07* (2013.01)

(58) Field of Classification Search
CPC .. H01H 13/702; H01H 13/703; H01H 13/704; H01H 13/14; H01H 13/48; H01H 2221/07; H01H 2219/03; G06F 3/0202
See application file for complete search history.

(56) References Cited

U.S. PATENT DOCUMENTS

| | | | | |
|---|---|---|---|---|
| 4,158,115 A | * | 6/1979 | Parkinson | ............ H01H 13/702 200/5 A |
| 5,072,077 A | * | 12/1991 | Klein | ................... H01H 13/702 200/292 |
| 5,138,119 A | * | 8/1992 | Demeo | ................ H01H 13/702 200/314 |

* cited by examiner

*Primary Examiner* — renee s luebke
*Assistant Examiner* — Vanessa Girardi
(74) *Attorney, Agent, or Firm* — Leong C. Lei

(57) ABSTRACT

A membrane keyboard structure and a conductive method thereof allows a first surrounding portion of a first flexible circuit layer to be deformed to pass through an through hole to be in direct contact and conduction with a second surrounding portion temporarily when it is pressed through the coordination of a first flexible sheet body, first flexible circuit layer configured on the first flexible sheet body, spacer layer positioned on one side of the first flexible sheet body adjacent to the first flexible circuit layer, second flexible sheet body configured on one side of the spacer away from the first flexible circuit layer and second flexible circuit layer configured on one side of the second flexible sheet body adjacent to the spacer layer. Whereby, the present invention can achieve the contact and conduction anywhere to make the use thereof easier and more convenient.

6 Claims, 10 Drawing Sheets

MEMBRANE KEYBOARD STRUCTURE AND CONDUCTIVE METHOD OF SAME

(a) TECHNICAL FIELD OF THE INVENTION

The present invention relates to a membrane keyboard structure and a conductive method thereof, and more particularly to a membrane keyboard structure and a conductive method thereof, capable of contact and conduction anywhere to allow the use thereof to be easier and more convenient.

(b) Description of the Prior Art

To be convenient for users to carry out an input operation such as typing or entering an account number or password on a variety of electronic devices, there are many different types of conventional keyboard (keypad) structures mainly including a plurality of keys, a plurality of elastic devices (for example, scissor switches) and keyboard substrate, where each elastic device is placed between each key and keyboard substrate, each key is formed with a pressing part, and the keyboard substrate has a plurality of conduction points corresponding to respective pressing parts kept a distance from each other through the elastic device. Therefore, the pressing part will be displaced and the elastic device corresponding thereto will be acted to touch the conduction point to achieve an input object when a certain key is pressed.

However, the key will be caused to be skewed in one direction and cannot be displaced normally when it is pressed improperly or because the elastic device is damaged, which is unable to touch the conduction point properly and cannot input anything.

SUMMARY OF THE INVENTION

To overcome the shortcomings mentioned above, the present invention is proposed.

The main object of the present invention is to provide a membrane keyboard structure and a conductive method thereof, allowing pressing at any angle to carry out conduction so as to facilitate the use thereof.

To achieve the object mentioned above, the present invention proposes a membrane keyboard, including at least one membrane circuit body and at least one light-transmitting key device configured on the membrane circuit body, where the membrane circuit body includes: at least one first flexible sheet body, having at least one first hollow portion; at least one first flexible circuit layer, configured on the first flexible sheet body and having at least one first surrounding portion around the first hollow portion; at least one spacer layer, configured on one side of the first flexible sheet body adjacent to the first flexible circuit layer, and the spacer layer having at least one through hole corresponding to the first surrounding portion; at least one second flexible sheet body, configured on one side of the spacer layer away from the first flexible sheet body, and the second flexible sheet body having at least one second hollow portion corresponding the first hollow portion; and at least one second flexible circuit layer, configured on one side of the second flexible sheet body adjacent to the spacer layer, the second flexible circuit layer having at least one second surrounding portion around the second hollow portion.

Therefore, the first surrounding portion can be deformed and passed through the through hole to be in contact with the second surrounding portion to achieve conduction and message transmission regardless of a user pressing the light-transmission key device anywhere when the membrane keyboard of the present invention is used.

DETAILED DESCRIPTION OF THE PREFERRED EMBODIMENTS

Figure 1:
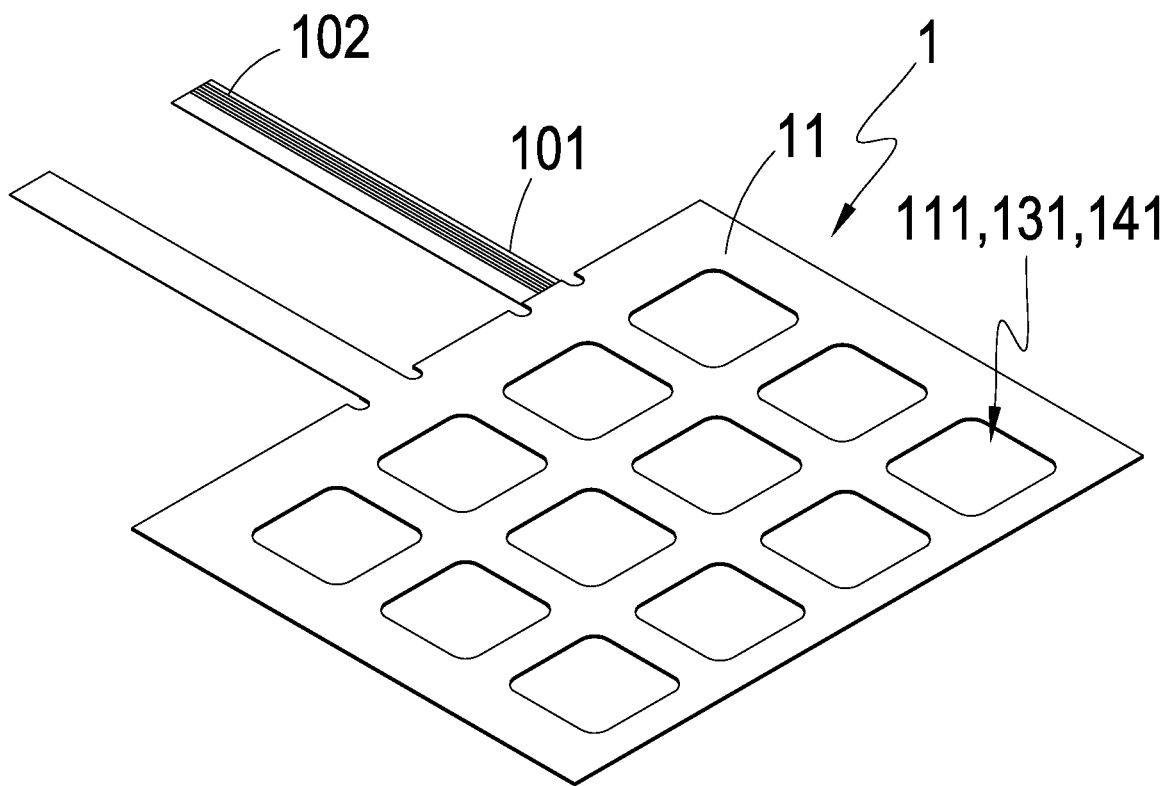
FIG. 1 is a perspective view of a preferred embodiment of the present invention.
Figure 2:
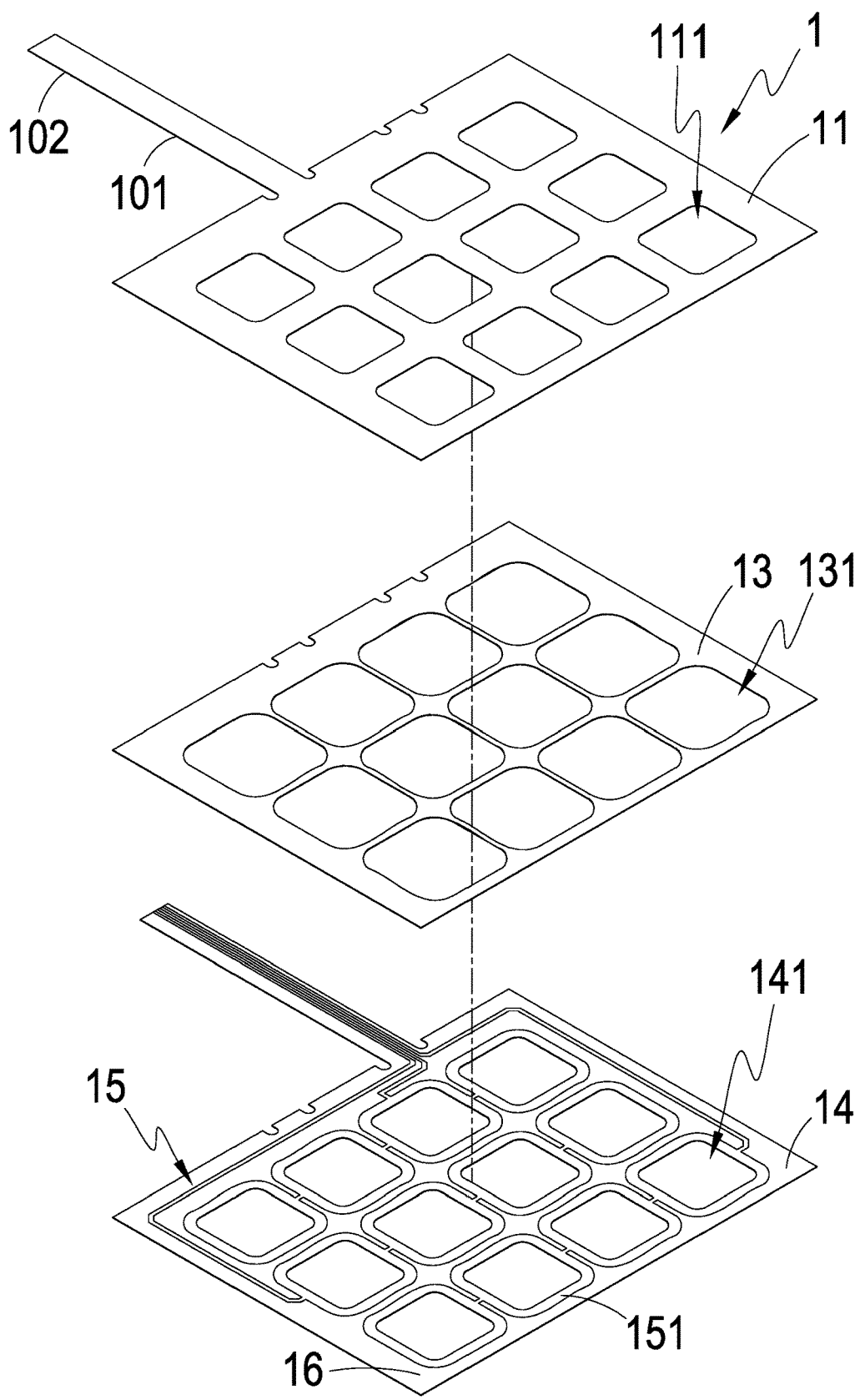
FIG. 2 is an exploded view of the embodiment of the present invention.
Figure 3:
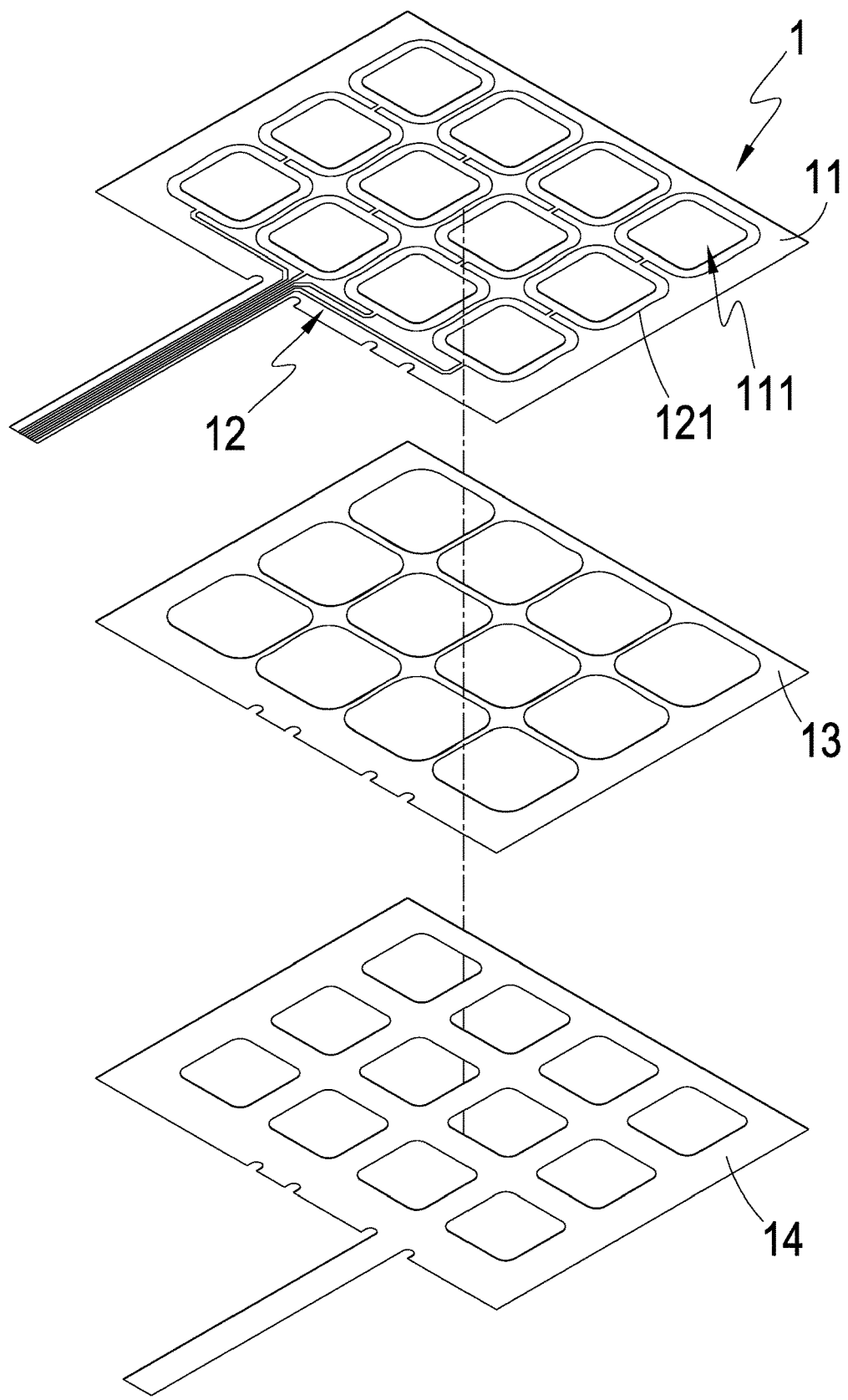
FIG. 3 is an exploded view of the embodiment of the present invention viewed from another angle.
Figure 4:
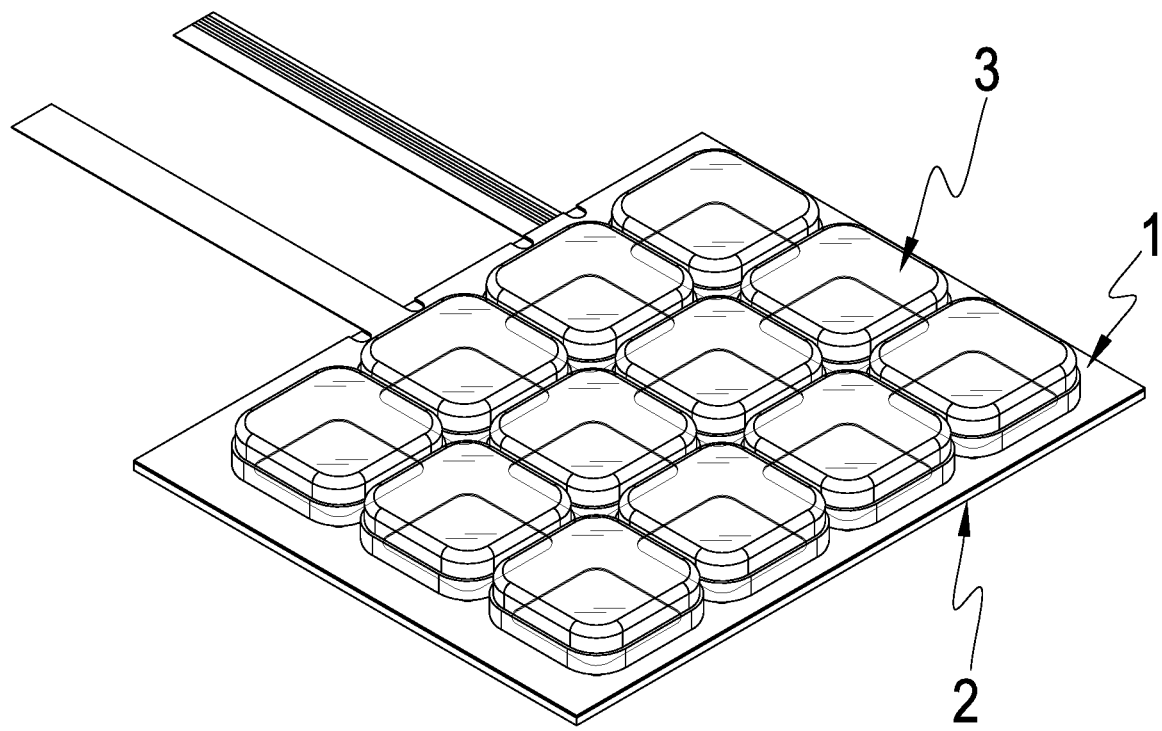
FIG. 4 is a perspective view of a modified embodiment of the present invention.
Figure 5:
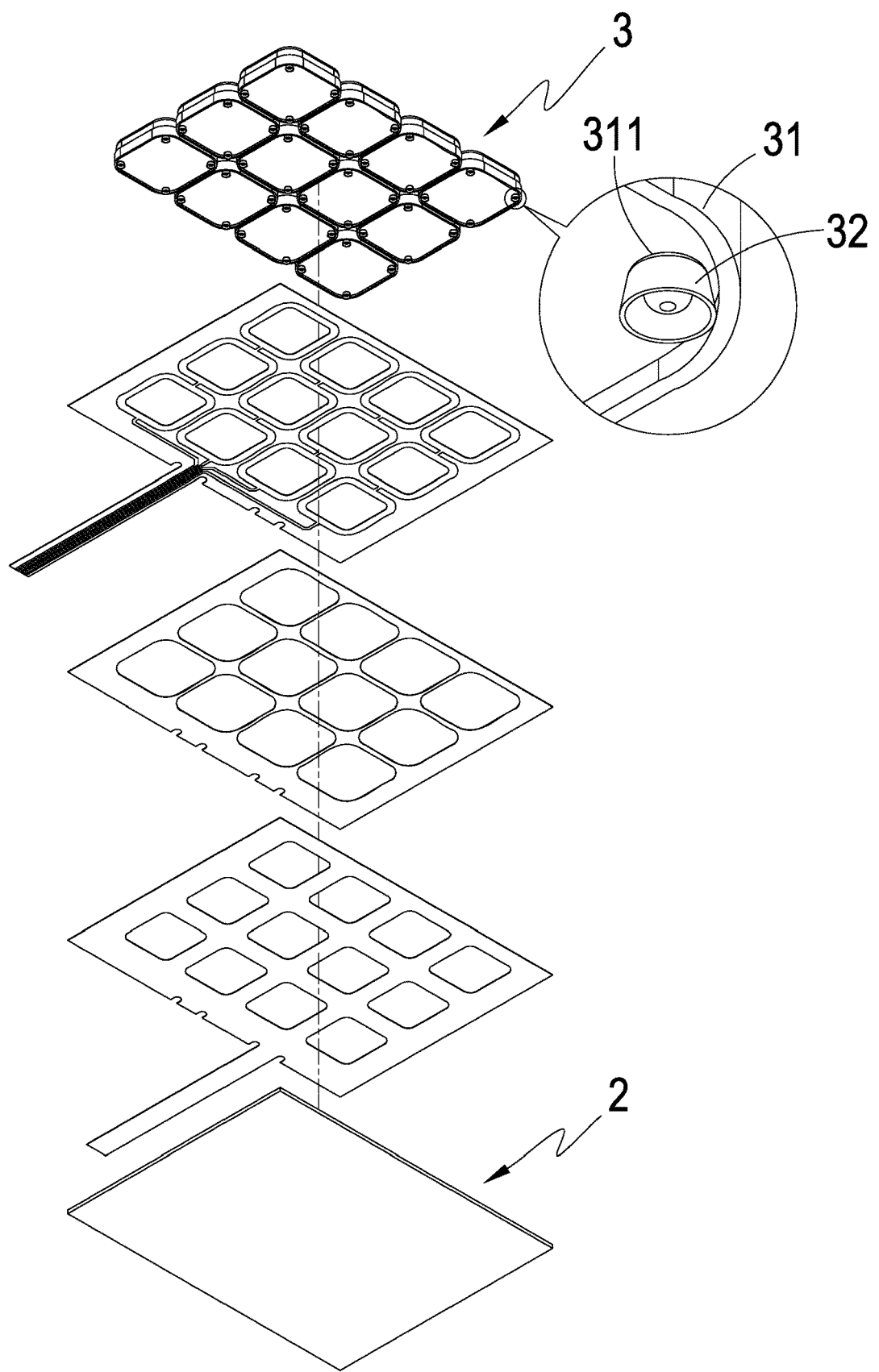
FIG. 5 is an exploded view of the modified embodiment of the present invention shown in FIG. 4.

Referring to FIGS. 1 to 5, a membrane keyboard of the present invention has at least one membrane circuit body 1, including at least one flexible sheet body 11, at least one first flexible circuit layer 12, at least one spacer layer 13, at least one second flexible sheet body 14 and at least one second flexible circuit layer 15.

The first flexible sheet body 11 is configured with at least one first hollow portion 111; the first flexible circuit layer 12 is configured on the first flexible sheet body 11 and has at least one first surrounding portion 121 around the first hollow portion 111. In addition, the first flexible circuit layer 12 may be a printed circuit or conductive silver paste.

The spacer layer 13 is configured on one side of the first flexible sheet body 11 adjacent to the first flexible circuit layer 12 and has at least one through hole 131 corresponding to the first surrounding portion 121, where the through hole 131 is larger than the first hollow portion 111, and the spacer layer 13 may be a printed layer or sheet.

The second flexible sheet body 14 is configured on one side of the spacer layer 13 away from the first flexible sheet body 11, and the second flexible sheet body 14 has at least one second hollow portion 141 corresponding to the first hollow portion 111; the second flexible circuit sheet 15 may be a printed circuit or conductive silver paste and is configured on one side of the second flexible sheet body 14 adjacent to the spacer layer 13. Furthermore, the second flexible circuit layer 15 has at least one second surrounding portion 151 corresponding to the first surrounding portion 121 around the second hollow portion 141. Therefore, the spacer layer 13 may be used to separate the first flexible circuit layer 12 (first surrounding portion 121) from the second flexible circuit layer 15 (the second surrounding portion 151). But, the through hole 131 corresponding to the first surrounding portion 12 allows the first surrounding portion 121 to be selectively in contact with the second surrounding portion 151.

At least one connecting portion 16 is configured between the first flexible sheet body 11 and second flexible sheet body 14 to connect and fix them together. In addition, one side of the membrane circuit body 1 is extended with at least one extension portion 101, one end of which is configured with at least one conduction portion 102 in electric connection with the first flexible circuit layer 12 and second flexible circuit layer 15.

In addition, the membrane keyboard of the present invention further has at least one display device 2 and at least one light-transmitting key device 3, where the display device 2 is configured on one side of the membrane circuit body 1 and corresponds to the through hole 131 so as to allow the image displayed on the display device 2 to pass through the through hole 141. Furthermore, the light-transmitting key device 3 is configured on another side of the membrane circuit body 1 and corresponds to the display device 2, and the light-transmitting key device 3 includes at least one light-transmitting body 31, at least one pressing portion 311 configured on the edge of the light-transmitting body 31 and corresponding to the first surrounding portion 121 (in the embodiment, the pressing portion 311 is respectively positioned on the four corners of the light-transmitting body 31 as implementation), and at least one elastic element 32 configured between the light-transmitting body 31 and membrane circuit body 1 and positioned on the periphery of the through hole 131, allowing the image displayed on the display device 2 not to be blocked and to transmit directly through the light-transmitting key device 3. But, the above is only one embodiment of the present invention, and the present invention is not so limited.

Figure 6:
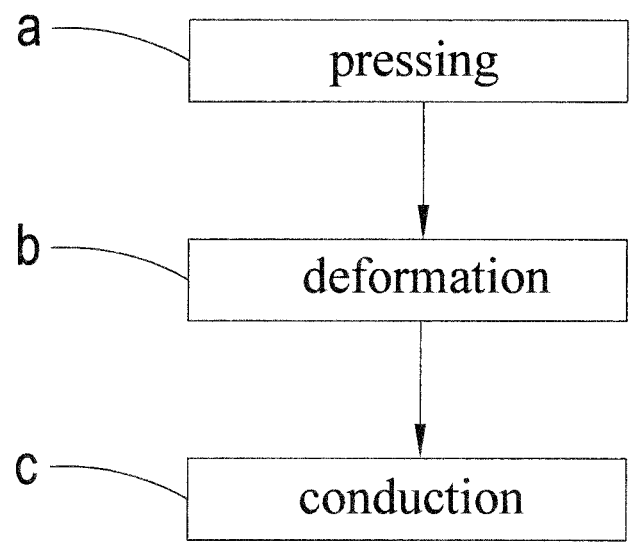
FIG. 6 is a flow chart of a preferred embodiment of a method of the present invention.

Referring to FIG. 6, a conduction method of the present invention has the following steps: (a) pressing, (b) deformation and (c) conduction.

Figure 7:
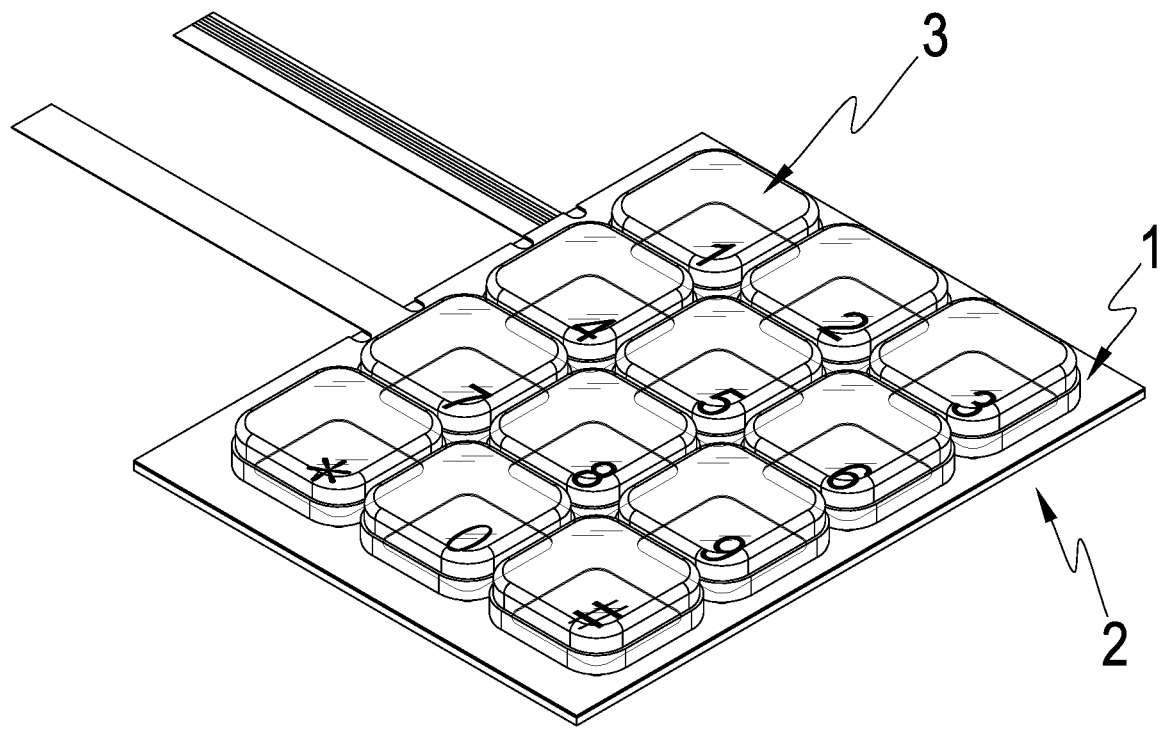
FIG. 7 shows a display of the embodiment of the present invention.

When the membrane keyboard of the present invention is used, the display device 2, as FIG. 7 shows, is acted to display the image, and the image can be revealed directly through the second hollow portion 141 of the second flexible sheet body 14, the through hole 131 of the spacer layer 13, the first hollow portion 111 of the first flexible sheet body 11 and the light-transmitting body 31 of the light-transmitting key device 3 in sequence to be clearly viewed by a user without being interfered or affected by the pressing portion 311 or elastic element 32.

Figure 8:
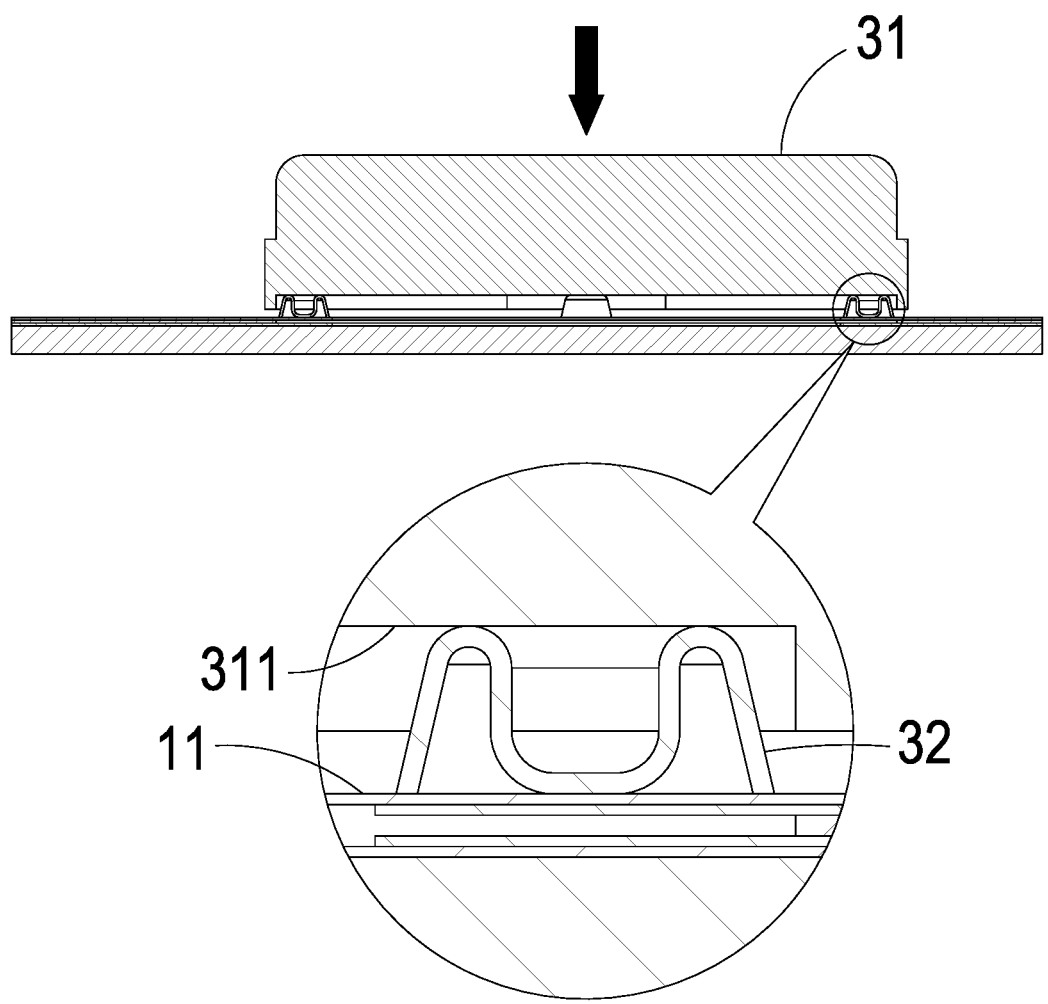
FIG. 8 is a schematic view of the embodiment of the present invention upon pressing.

Referring to FIG. 8, step (a) pressing is carried out: pressing the light-transmitting body 31 to drive each pressing portion 311 to displace and cause the elastic element 32 to be deformed to store energy and be in contact with the first flexible sheet body 11 and press it to cause it to be deformed when the membrane keyboard of the present invention is operated.

Figure 9:
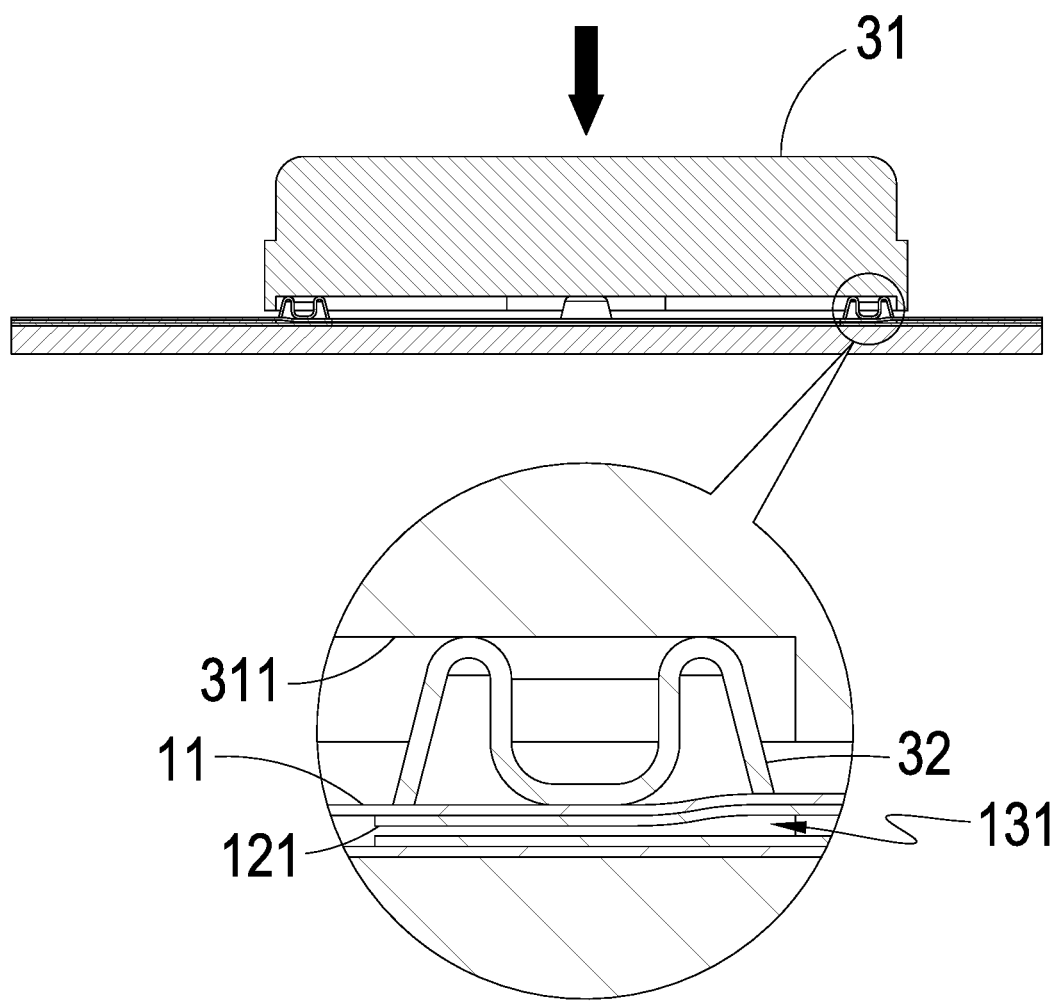
FIG. 9 is a schematic view of the embodiment of the present invention upon deformation.

Referring to FIG. 9, step (b) is then carried out: driving the first surrounding portion 121 of the first flexible circuit layer 12 to deform with the first flexible sheet body 1 to pass through the through hole 131 of the spacer layer 13. In addition, the pressing portion 311 allows the first surrounding portion 121 to be deformed to pass through the through hole 131, making it easier and more convenient to use regardless of the light-transmitting body 31 at any skew angle even if the position that a user presses the light-transmitting body 31 is skewed or the elastic element 32 is damaged because of the first surrounding portion 121 and the surrounding structure of each pressing portion 311.

Figure 10:
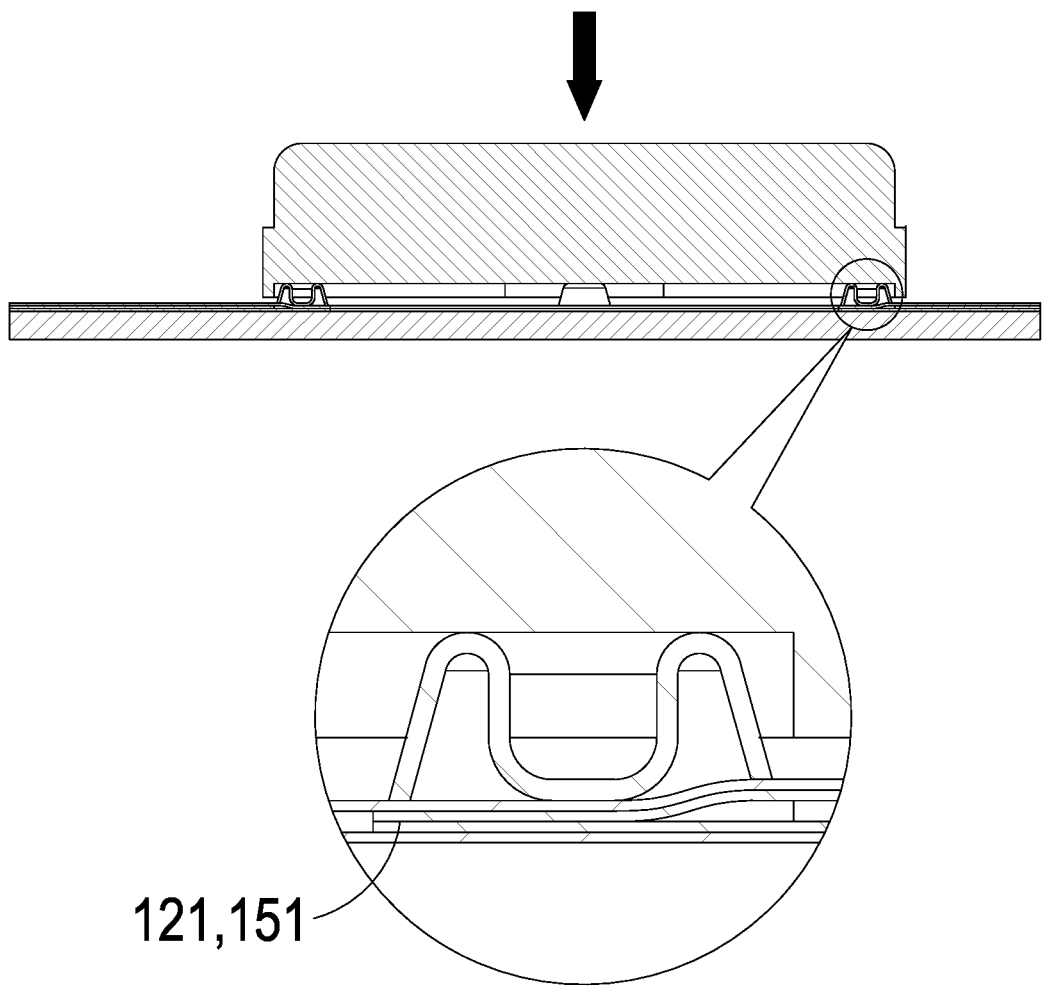
FIG. 10 is a schematic view of the embodiment of the present invention upon conduction.

Referring to FIG. 10, step (c) conduction is further carried out: contacting the first surrounding portion121 with the second surrounding portion 151 so that the first flexible circuit layer 12 can be in conduction with the second flexible circuit layer 15 temporarily, and Indicating that the light-transmitting key device 33 is pressed down for input through the conduction portion 102, extension portion 101, first surrounding portion 121, second surrounding portion 151, extension portion 101 and conduction portion 102 constituting a loop; in addition, loosening the light-transmitting body 31 to recover the elastic element 32 to release energy, allowing the light-transmitting body 31, pressing portion 311 and first surrounding portion 121 to restore an original state, making the first surrounding portion 121 to separate from the second surrounding portion 151 again.

Therefore, the present invention has the following advantages over the prior arts:

1. with the coordination of the first flexible sheet body 11, first flexible circuit layer 12 (first surrounding portion 121), spacer layer 13, second flexible sheet body 14 and second flexible circuit layer 15 (second surrounding 15), the contact and conduction is allowed to be reached at any position in the present invention so that it is easier and more convenient to use.
2. with the coordination of the membrane circuit body 1, display device 2 and light-transmitting key device 3, the present invention is allowed to have a clear display.

I claim:

1. A membrane keyboard structure, having at least one membrane circuit body, comprising:
   at least one first flexible sheet body, having at least one first hollow portion;
   at least one first flexible circuit layer, configured on said first flexible sheet body and having at least one first surrounding portion around said first hollow portion;
   at least one spacer layer, configured on one side of said first flexible sheet body adjacent to said first flexible circuit layer, and said spacer layer having at least one through hole corresponding to said first surrounding portion;
   at least one second flexible sheet body, configured on one side of said spacer layer away from said first flexible sheet body, and said second flexible sheet body having at least one second hollow portion corresponding said first hollow portion; and
   at least one second flexible circuit layer, configured on one side of said second flexible sheet body adjacent to said spacer layer, said second flexible circuit layer having at least one second surrounding portion around said second hollow portion, and said second surrounding portion corresponding to said first surrounding portion to facilitate selective contact;
   wherein one side of said membrane circuit body is configured with at least one display device corresponding to said through hole;
   wherein another side of said membrane circuit body is configured with at least one light-transmitting key device corresponding to said display device, said light-transmitting key device comprising at least one light-transmitting body, at least one pressing portion configured on an edge of said light-transmitting body and corresponding to said first surrounding portion, and at least one elastic element configured between said light-transmitting body and membrane circuit body and positioned on a periphery of said through hole; and
   wherein the at least one elastic element comprises a plurality of individual elastic elements arranged on a periphery of the at least one light-transmitting body in alignment with a periphery of the through hole.

2. The structure according to claim 1, wherein at least one connecting portion is configured between said first flexible sheet body and second flexible sheet body.

3. The structure according to claim 1, wherein one side of said membrane circuit body is configured with at least one extension portion, and one end of said extension portion is configured with at least one conduction portion.

4. A conductive method for a membrane keyboard, carrying out conduction through at least one membrane circuit body, having the following steps:
   (a) pressing a first surrounding portion of at least one first flexible circuit layer on at least one first flexible sheet body, and avoiding at least one first hollow portion of said first flexible sheet body;
   (b) deforming said first surrounding portion to pass through at least one through hole of at least one spacer layer; and
   (c) contacting and conducting said first surrounding portion with a second surrounding portion of a second flexible circuit layer on at least one second flexible sheet body and avoiding at least one second hollow portion of said second flexible sheet body,
   wherein one side of said membrane circuit body is configured with at least one display device corresponding to said through hole;
   wherein another side of said membrane circuit body is configured with at least one light-transmitting key device corresponding to said display device, said light-transmitting key device comprising at least one light-transmitting body, at least one pressing portion configured on an edge of said light-transmitting body and corresponding to said first surrounding portion, and at least one elastic element configured between said light-transmitting body and membrane circuit body and positioned on a periphery of said through hole; and
   wherein the at least one elastic element comprises a plurality of individual elastic elements arranged on a periphery of the at least one light-transmitting body in alignment with a periphery of the through hole.

5. The method according to claim 4, wherein at least one connecting portion is configured between said first flexible sheet body and second flexible sheet body.

6. The method according to claim 4, wherein one side of said membrane circuit body is configured with at least one extension portion, and one end of said extension portion having at least one conduction portion.

* * * * *